United States Patent [19]
Teraguchi et al.

[11] Patent Number: 4,910,411
[45] Date of Patent: Mar. 20, 1990

[54] APPARATUS FOR INSPECTING A SIDE WALL OF A TIRE

[75] Inventors: Takashi Teraguchi, Nishinomiya; Atsuhiko Tanaka, Toyota, both of Japan

[73] Assignee: Sumitomo Rubber Industries, Hyogo, Japan

[21] Appl. No.: 305,238

[22] Filed: Feb. 2, 1989

[30] Foreign Application Priority Data

Feb. 12, 1988 [JP] Japan .................................. 63-31374

[51] Int. Cl.$^4$ .......................................... H04N 7/18
[52] U.S. Cl. ..................................... 250/563; 358/106
[58] Field of Search ............... 250/562, 563, 571, 572, 250/223 B; 356/429–431; 358/106; 73/146

[56] References Cited

U.S. PATENT DOCUMENTS

| | | | |
|---|---|---|---|
| 4,095,464 | 6/1978 | Breedijk | 358/106 |
| 4,280,624 | 7/1981 | Ford | 358/106 |
| 4,488,648 | 12/1984 | Claypool | 358/106 |
| 4,638,354 | 1/1987 | Denimal | 358/106 |
| 4,679,075 | 7/1987 | Williams et al. | 358/106 |
| 4,776,466 | 10/1988 | Yoshida | 358/106 |

Primary Examiner—David C. Nelms
Assistant Examiner—Stephone B. Allen
Attorney, Agent, or Firm—Jordan and Hamburg

[57] ABSTRACT

An apparatus for inspecting a side wall of a tire including an optical sensor provided so as to face a side wall surface of a rotatable tire for reading a variation of distance to the side wall surface as an irregularity signal, memory means for storing an irregularity signal read by the optical sensor, usable data discrimination means for discriminating whether or not the signal read out from the memory means is usable as irregularity inspection data, correction means for removing detection-unrequired irregularities from the data discriminated as usable data by the usable data discrimination means, height calculation means for finding out an irregularity falling within a predetermined condition in the corrected data and calculating the height of the irregularity, and determination means for determining based on the height of the irregularity calculated by the height calculated means where there is an abnormal irregularity.

8 Claims, 5 Drawing Sheets

APPARATUS FOR INSPECTING A SIDE WALL OF A TIRE

BACKGROUND OF THE INVENTION AND RELATED ART STATEMENT

This invention relates to an apparatus for inspecting the irregularity of a side wall surface of a tire to discriminate the quality of the tire.

It has been known that due to uneven intervals of ply cords, uneven overlapped amounts of ply joint and other causes, irregularities arise on a side wall surface of a tire when the tire is filled up with air. Such irregularities give bad influence to the uniformity of a tire and also mar the outside appearance to lower the marketability of the tire. For these reasons, it has been required to detect undesirable irregularities on the side will surface of the tire in inspection stage.

However, in addition to irregularities which are required to detect, there are irregularities caused by letterings, codes, marks, spews, dirts on a tire side wall surface, and the like which are not required to detect. Accordingly, it could be seen that it is necessary to separate signals generated by such irregularities as not required to detect from those generated by irregularities required to detect.

A conventional apparatus for inspecting the irregularity of a side wall surface is disclosed in Japanese Examined Patent Publication No. 62-30361. The conventional apparatus which utilizes an electrostatic capacity sensor can obtain no more than an averaged value in an area having a great circumferential length for example, exceeding 1 mm due to performance characteristics of the electrostatic capacity sensor and consequently provides inaccurate inspection. In the conventional apparatus, to eliminate signals caused by detection-unrequired irregularities of reduce the influence of detection-unrequired irregularities as letterings, marks, codes, spews, an area to be detected by the electrostatic capacity sensor is set so as to have a long radial length and a short circumferential width. However, it could be seen that due to performance characteristics of an electrostatic capacity sensor, it is in fact difficult the conventional apparatus to separate signals caused by detection-unrequired irregularities from those caused by detection-required irregularities.

Consequently, it will be apparent that the inspection accuracy of the conventional apparatus is very low because of the fact that signals caused by such detection-unrequired irregularities as letterings, marks, codes, spews, and dirts on a tire side wall surface are frequently mistakenly discriminated as signals caused by detection-required irregularities.

Also, the conventional apparatus which utilizes a filter and the like is liable to generate detection signals having deformed waveforms and consequently further lowers the inspection accuracy.

SUMMARY OF THE INVENTION

The present invention has overcome the abovementioned problems.

It is an object of the present invention to provide an apparatus for inspecting a side wall surface of a tire which makes it possible to eliminate the influence of such detection-unrequire irregularities as letterings, marks, codes, spews, dirts and the like without deforming the waveform of a detection signal and accurately detect an abnormal irregularity which is required to detect and assure an increased inspection accuracy.

Accordingly, an apparatus of the present invention comprises an optical sensor provided so as to face a side wall surface of a rotatable tire for reading a variation of distance to the side wall surface as an irregularity signal, memory means for storing the irregularity signal read by the optical sensor, usable data discrimination means for discriminating whether or not the data read out from the memory means is usable as irregularity inspection data, correction means for removing a detection-unrequired irregularity from the data discriminated as usable data by the usable data discrimination means, height calculation means for finding out an irregularity falling within a predetermined condition in the corrected data and calculating the height of the irregularity, and determination means for determining based on the height of the irregularity calculated by the height calculation means whether there is an abnormal irregularity.

Also, the present invention preferably includes an optical sensor which is movable to and away from a side wall surface of a tire and set at a most suitble detection position specified in advance in accordance with either tire categories or tire sizes.

Furthermore, the present invention preferably includes an optical sensor having a spot diameter of 1.00 mm or smaller, and signal sampling means for sampling a signal of the sensor in such an interval that the detection areas do not overlap one another in a circumferential direction of the tire, so that more accurate detection is obtained.

Furthermore, the present invention preferably includes a plurality of optical sensors facing a side wall surface of a tire which are provided in a radial direction of the tire at an interval.

Furthermore, the present invention preferably includes correction means in which discrimination of a detection-required irregularity and a detection-unrequired irregularity is effected based on the width of the irregularity and whether the irregularity has a flat center portion or not.

According to the present invention, all the irregularities on a side wall surface of a tire are detected by the use of an optical sensor and the detection signals is stored as inspection data, and the inspection data is corrected so as to remove detection-unrequired irregularities, and an irregularity falling within a predetermined condition is found out, and the height of the irregularity is calculated, and final determination as to whether there is an abnormal irregularity is effected based on the calculated height of the irregularity. Consequently, an apparatus of the present invention assuredly eliminates the influence of letterings, marks, codes, and the like and then correctly detects detection-required irregularities. Thus, inspection accuracy is increased.

Also, since an optical sensor is set at a most suitable detection position, inspection accuracy is further increased.

Moreover, an apparatus of the present invention which has signal sampling means for sampling a signal of the sensor in such an interval that detection areas do not overlap one another in a circumferential direction of the tire can obtain accurate detection signals having no overlapped portions.

Furthermore, since an apparatus of the present invention has a plurality of optical sensors facing a side wall surface which are provided in a radial direction of the tire at an interval so as to take over their respective portions of a detection zone at the same time, clearer discrimination of detection-required irregularities from detection-unrequired irregularities is executable and thus further increased inspection accuracy can be obtained.

Furthermore, since an apparatus of the present invention has correction means for detecting the width of an irregularity and checking whether the irregularity has a flat center portion so that an detection-unrequired irregularity is removed from the data discriminated as usable data by the usable data discrimination means, more accurate elimination of detection-unrequired irregularities is effectable.

DETAILED DESCRIPTION OF PREFERRED EMBODIMENTS OF THE INVENTION

Figure 5:
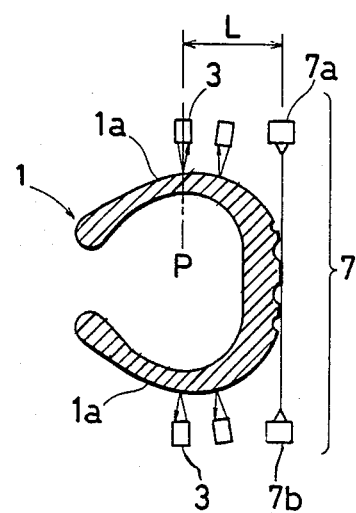
FIG. 5 is a sectional view showing a part of the embodiment.
Figure 4:
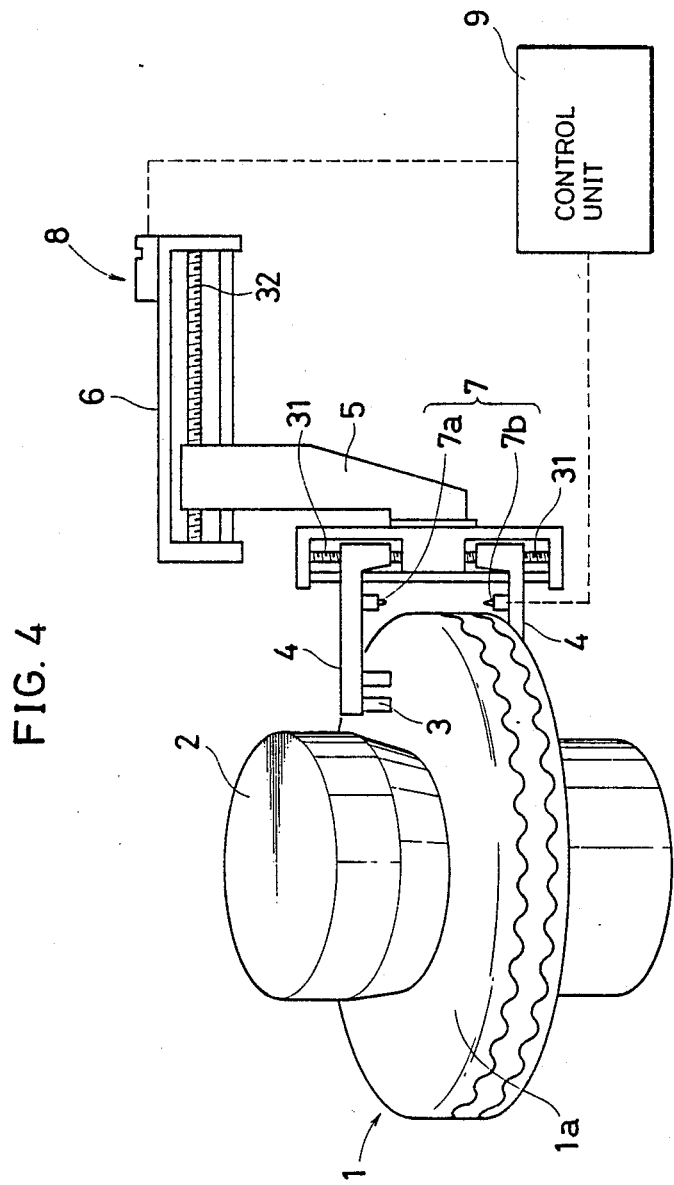
FIG. 4 is a schematic diagram of the embodiment specifically showing positions of sensors and a construction of supporting the sensors.

Referring to FIGS. 4 and 5 showing an apparatus for inspecting the both side wall surfaces 1a, 1a a tire 1 filled up with air, the tire 1 is supported in a horizontal position by a support drum 2. The support drum 2 is rotated by a driving mechanism not shown in the drawing. Inspection of the irregularity of side wall surface is carried out with the tire being rotated by the driven support drum 2.

Perpendicularly to the both side wall surfaces 1a, 1a are respectively provided optical displacement sensors 3 (hereinafter referred to as sensor). Specifically, a plurality of sensors 3, e.g., two sensors, are provided in a radial direction of the tire 1 at an appropriate interval. The sensor 3 is adopted for measuring variation of distance to the side wall surface 1a to detect irregularities. The sensors 3 are attached to arms 4, 4 respectively. The arms 4,4 are mounted on a frame 5. Also, The arms 4, 4 are independently movable in a vertical direction. The arms 4, 4 are moved so as to adjust the vertical position of the sensor 3 with respect to the side wall surface, i.e., the distance between the sensor and the side wall surface. The frame 5 is carried by a support member 6 and movable in a parallel direction to a radial direction of the tire 1. The frame 5 is moved so as to adjust the radial position of the sensor 3.

Indicated at 31, 32 are screwed shafts which are rotated by a motor not shown in the drawing.

Below will be described in detail the adjustment of the stoppage position of the sensor 3 in a radial direction of the tire 1.

An emitter element 7a and a receiver element 7b are provided on base portions of the arms 4, 4 respectively to constitute a position detector 7. In setting the sensor 3 at a most suitable detection position P, when detection light of the position detector 7 is interrupted by the tire 1 after the frame 5 is horizontally moved toward the tire 1, it is determined that the sensors 3 reach a reference position.

However, it should be noted that the height of side wall from a bead heel changes in accordance with tire sizes, and accordingly a most suitable detection position P or position at which irregularities are most liable to occur due to uneven intervals of ply cords, uneven amounts of ply joint, or the like changes in accordance with tire sizes. Also, as shown in FIG. 5, a distance L between the position detector 7 and a particular sensor 3 of the sensor group to be positioned at the most suitable detection position P is fixed. Accordingly, it is preferable to predetermine in accordance with tire sizes a delay stopping time which is a period between a time when the position detector 7 is interrupted and a time when the particular sensor reaches the most suitable detection position P.

The position detector 7 sends a reference positional signal to a control unit 9 for controlling a frame driving mechanism 8. The movement of the frame 5 is controlled based on the reference positional signal and the delay stopping time in accordance with tire sizes or tire diameters. For example, in the case of one tire having one size, the frame 5 is stopped immediately after the position detector 7 detects the reference position. In the case of another tire having a different size, the frame 5 is stopped upon the lapse of a predetermined delay stopping time after the position detector 7 detects the reference position. The predetermined delay stopping time is set by a timer not shown in drawing. Subsequently, the arm 4 is moved toward the side wall surface with measuring distance to the side wall surface and then stopped when reaching a predetermined position.

As described above, the sensor 3 is automatically set at a most suitable detection position which is predetermined in accordance with tire sizes. Specifically, a most suitable detection position is one at which irregularities have been seen from experiences and statistics to be liable to pour in radial directions in a side wall surface of each size tire due to the construction of tire. Consequently, the sensor 3 is set at a position suitable for detecting irregularities.

Two or more sensors 3 are provided in a radial direction to one side wall surface of a tire so as to make it easy to discriminate detection-required irregularities running in radial directions from detection-unrequired irregularities. Also, for the sensor 3 is used an optical displacement sensor having a small spot diameter, for example, a diameter of 1.0 mm or smaller. It should be noted that the term of spot diameter means a diameter of area which can be detected by a sensor at the same time. Also, it should be noted that the spot diameter of the sensor 3 used in this embodiment is smaller than the width of a lettering element having a smallest width.

Figure 6A:
FIG. 6 is a diagram showing a bulge form difference, (a) showing an actual form of the bulge, (b) showing a waveform issued by a small spot diameter sensor detecting the bulge, and (c) showing a waveform issued by a large spot diameter sensor detecting the bulge.
Figure 6B:
Figure 6C:
Figure 7A:
FIG. 7 is a diagram showing a lettering form difference, (a) showing an actual form of the lettering, (b) showing a waveform issued by a small spot diameter sensor detecting the lettering, and (c) showing a waveform issued by a large spot diameter sensor detecting the lettering.
Figure 7B:
Figure 7C:

When using a sensor having a spot diameter exceeding 1.0 mm, a detection value is obtained in terms of in average amount in the detection area. Accordingly, it could be seen from FIGS. 6 and 7 that a difference between a detection-required irregularity and a detection-unrequired irregularity is unclear and misinspection is consequently liable to result.

Accordingly, it could be understood that this embodiment in which irregularities on the side wall surface are detected by the ue of a plurality of sensors each having a small spot diameter with the sensors taking over their respective portions of a detection zone at the same time provides a considerably higher accuracy than inspections in which irregularities ar detected in a large area by use of one sensor having a large spot diameter because the former obtains a clear detection of irregularities.

Figure 1:
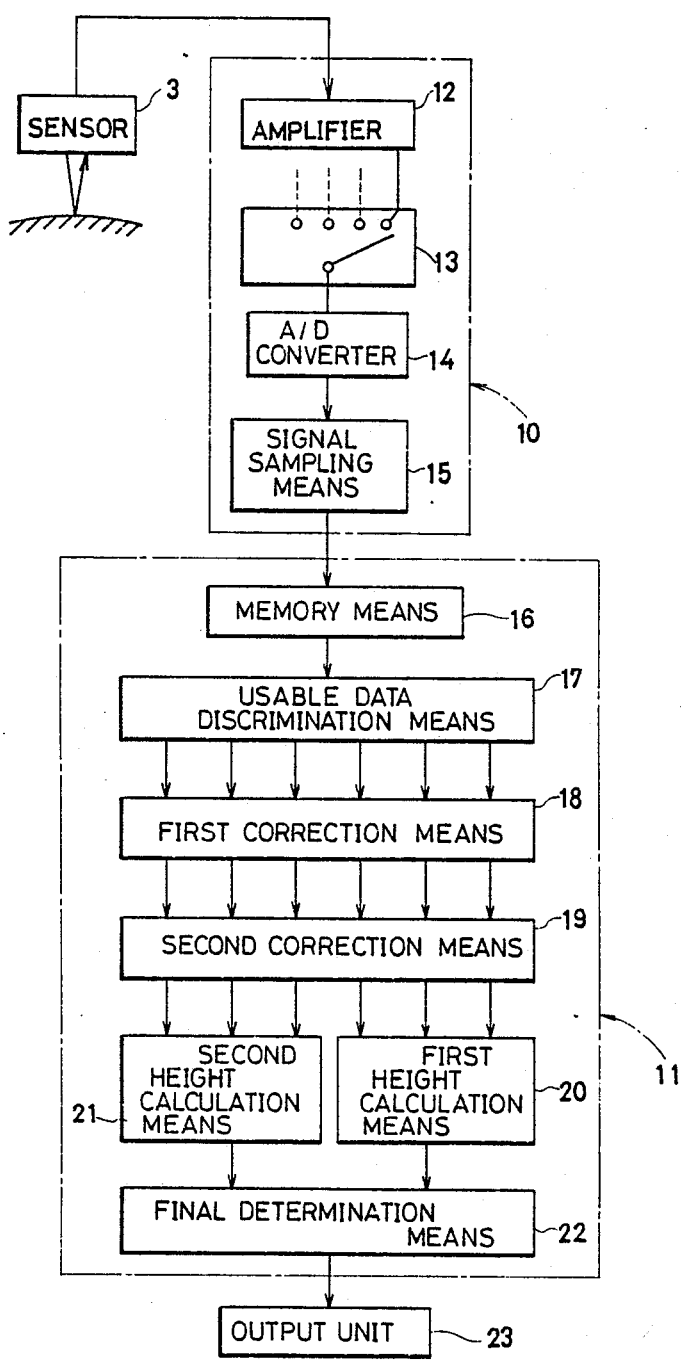
FIG. 1 is a block diagram of an embodiment of the present invention.

As shown in FIG. 1, output signals of the sensors 3 are sent to a data processor unit I1 including a microcomputer through an input unit 10 at a predetermined detection pitch.

The input unit 10 includes an amplifier 12 for increasing an output signal of each of a plurality of sensors 3, a multiplexer 13 for switching output signals of the plurality of sensors 3 at a time considerably shorter than a sampling interval, a A/D converter 14 for converting the analog output signal into a digital signal at such a short time as the multiplexer 13, and signal sampling means 15 having an encoder, a pulse generator and the like.

The signal sampling means 15 samples a continuous circumferential output signal of the sensor 3 in such an interval that detection areas do not overlap one another in a circumferential direction of the tire. Also, the sensor 3 has a spot diameter of 1 mm or smaller as mentioned above. Consequently, irregularities can be detected at an increased accuracy.

The data processor unit 11 includes memory means 16 for storing sampled signals, e.g , a RAM memory, unable data discrimination means 17 for discriminating whether or not data read out from the memory means 16 are one concerning irregularities on the side wall surface, first and second correction means 18, 19 for removing detection-unrequired irregularities from the data discriminated as usable data by the usable data discrimination means 17, first height calculation means 20 for finding out an irregularity falling within a predetermined condition in the corrected data concerning irregularities on the upper side wall surface and calculating the height of the irregularity second height calculation means 21 for finding out an irregularity falling within a predetermined condition in the corrected data concerning irregularities in the lower side wall surface and calculating the height for the irregularity, and final determination means 22 for determining based on the calculated heights of the irregularities whether there is an abnormal irregularity. Below will be described each means in detail.

(I) Usable Data Discrimination Means 17

When normal detection is not carried out, for example, a lens of the sensor 3 or a side wall surface in greatly soiled, or the sensor 3 is not set at a suitable position, output of the sensor 3 comes to a high value exceeding a measurable range. When the data read out from the memory means 16a includes a predetermined number or more of such abnormal data, the usable data discrimination means 17 judges that the data is not usable and then suspends the following operations. Data which are discriminated to be usable are sent to the first and second correction means 18, 19 n which the data are then corrected.

(II) First Correction Means 18

Figure 2A:
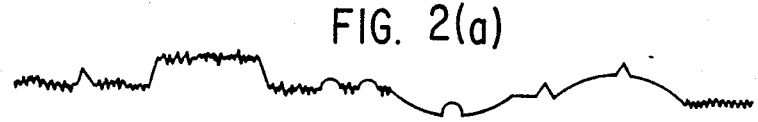
FIG. 2 is a diagram showing waveforms of a detection signal, (a) showing a waveform of the signal before corrected by correction means, (b), (c), (d) showing respective waveforms of the signal after corrected by correction means step by step.

The raw data sent from the usable data discrimination means 17 are in the form of waveforms having a number of fine irregularities as shown in FIG. 2(a). Such fine irregularities cause efficiency of the following operations to lower. Accordingly, the first correction means 18 corrects the raw data to such a basic waveform as shown in FIG. 2(b) by checking the raw data in an entire circumference to find a portion having a predetermined number or more of fine irregularities having width smaller than a predetermined width, smoothing the fine irregularities.

Figure 2B:
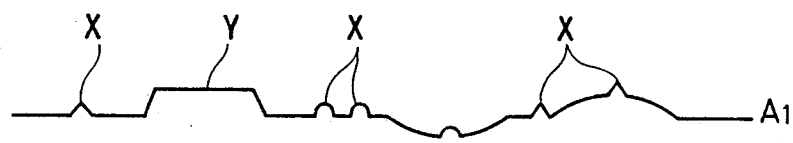

However, the basic waveform of FIG. 2(b) includes small irregularities X caused by spews, peak marks, small letterings, letterings consisting of line-like thin projections or hollow-type letterings, or dirty which can not be checked by the usable data discrimination means 17.

The first correction means 18 eliminates such small irregularities. More specifically, a horizontal distance between a start point and an end point of a small irregularity, i.e., a width of the small irregularity, is found out. Small irregularities whose width are smaller than a predetermined width are eliminated as unnecessary irregularities. Consequently, such a waveform as shown in FIG. 2(c) is obtained.

(III) Second Correction Means 19

Figure 2C:
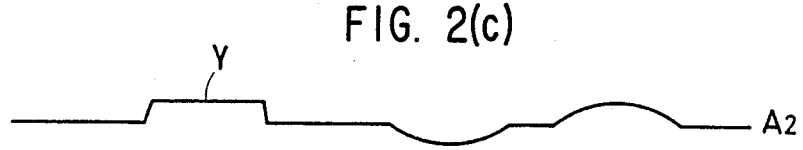

However, it could be seen that a large irregularity Y having a larger width remains in the waveform of FIG. 2(c). The large irregularity may be caused by solid-type letterings or the like. The second correction means 19 removes such large irregularities. More specifically, the second correction means 19 finds out large irregularities having widths larger than a predetermined width and a flat center portion and eliminate them. It should be noted that "flat center portion" features large letterings. Also, it should be noted that large irregularities having "flat center portion" includes not only one having a full straight flat center portion but also one having a predetermined proportion of straight portion with respect to the full width.

Figure 2D:
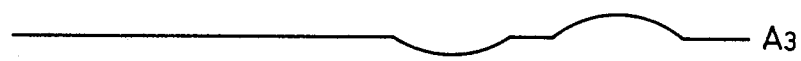

Consequently, such a waveform as shown in FIG. 2(d) is obtained. It could be seen that the waveform of FIG. 2(d) includes no detection-unrequired irregularities X, y but includes detection-required irregularities.

(IV) First and Second Height Calculation Means 20, 21

The first and second height calculation moans 20, 21 find out an irregularity falling within a predetermined condition, then calculating the height of the irregularity. Specifically, The waveform of FIG. 2(d) yet includes a gentle rise and fall caused by reflection of tire and greatly fine irregularities uncorrectable the first correction means 18. Such gentle rise and fall and greatly fine irregularities are not required to detect. Accordingly, the first and second height calculation means 20, 21 neglect such irregularity having a considerably large width and then take up the remained irregularities as detection-required irregularity. Also, it should be noted that an irregularity having greatly fine irregularities is judged as one detection required irregularity. Furthermore, it should be noted that an irregularity having a predetermined number of small discontinuities and a predetermined number of small reverse inclinations is judged as one detection-required irregularity.

Subsequently, the height of the irregularity falling within the above-mentioned conditions is calculated.

It should be noted that even when detecting the same irregularity on the side wall surface, positional difference of the sensors 3 differentiates the judgment of irregularity. Also, it should be noted that there is a gap between data obtained by the sensor and data actually perceived by human beings. It is generally known that with respect to a projected surface, its height perceived by human beings is smaller than the true height, and with respect to a recessed surface, its depth perceived by human beings is greater than the true depth. Furthermore, it has been known that such cap is changed by the state of surface surrounding the irregularity, for example, whether or not knurled processing is provided. The judgment of irregularity is carried out based on a Determination Value which includes the above-mentioned factors.

An irregularity having a height greater that a predetermined height is determined to be abnormal. Evaluation of a portion in a radial direction of the tire is effected by the following equation:

$$\text{Evaluation Value} = \text{Maximum Height} + N \times A + B$$

Wherein Maximum Height means a height which is maximum in heights obtained by a plurality of sensors, N represent the number of sensors forwarding the evaluation of "abnormality" with respect to the portion in the radial direction of the tire, A represents a factor for preventing an abnormal irregularity from being determined to be normal, B represents a factor for executing correction when a knurled processing or the like is provided.

The same calculation is carried out with respect to other radial portions. An evaluation value which is highest in all the calculated evaluation values is taken up as total evaluation value. The first and second height calculation means 20, 21 separately send their respective total evaluation values to the final determination means 22.

(V) Final Determination Means 22

The final determination means 22 compares the two total evaluation values sent from the first and second height calculation means 20, 21 with each other and then takes up a higher total evaluation value as final data. The final data is ranked based on its value to determine which a tire having the final data is good or bad. For example, the final data in graded by four ranks A, B, C, and D. It is determined in advance that a tire having a final data placed in rank D is bad, i.e., defective tire.

Result of the final determination is sent to an output unit 23 which then outputs a warning signal to provide an indication of "defective tire" by means of a warning device or the like.

The above-mentioned series of operations will be described in more detail with reference to a flowchart shown in FIG. 3.

At Step S1, firstly, the frame 5 is moved forward to the tire. At Step S2, it is checked based on signals from the position detector 7 whether to frame 5 reaches the reference position. In the case of one size tire, e.g., A-size tire, at Step S3, the forward movement of the frame 5 is stopped after the lapse of a predetermined time of t second after the reaching of the reference position. In the case of another size tire, e.g., B-size tire, at Step S3, the movement of the frame 5 is stopped immediately after the reaching of the reference position, that is the predetermined time t is zero. At Step S4, the arms 4, 4 are moved forward to the side walls. At Step S5, it is checked based on output of the sensor 3 whether the sensor 3 is set at the most suitable detection position having a predetermined distance to the side wall 1a. At Step S6, the movement of arms 4, 4 is stopped immediately after the sensor 3 is set at the most suitable detection position. After the movement of the arms 4,4 is stopped, the receiving and picking up of signals from the sensors 3 are executed. After the receiving and picking up of signals corresponding to an entire detection circumference of the tire are completed, the arms 4, 4 and the frame 5 are moved back their respective original positions at Step S8.

At Step S9. picked up signals are stored as detection data in the memory means 16 of the data processing unit 11. At Step S10 it is discriminated in the usable data discrimination means in whether data read out from the memory means 16 are usable. When the data is discriminated to be usable, the procedure advances to Step S11 at which the data is then corrected by the first and second correction means 18, 19. At Step S12, the first and second height calculation means 20, 21 find out an irregularity falling within a predetermined condition and then calculate the heights of detection-required irregularities. At Step S13, a final determination is made by the final determination means 22. At Step S14, finally, a final determination signal is sent from the output unit 23 to a warning device or the like.

When the direction data is discriminated at Step 10 to be unusable, for example, the detection data includes data concerning dirts on the side wall surface or the like, the procedure advances directly to Step S14 at which the output unit 23 issues a signal indicating that the data is unusable.

Figure 3:
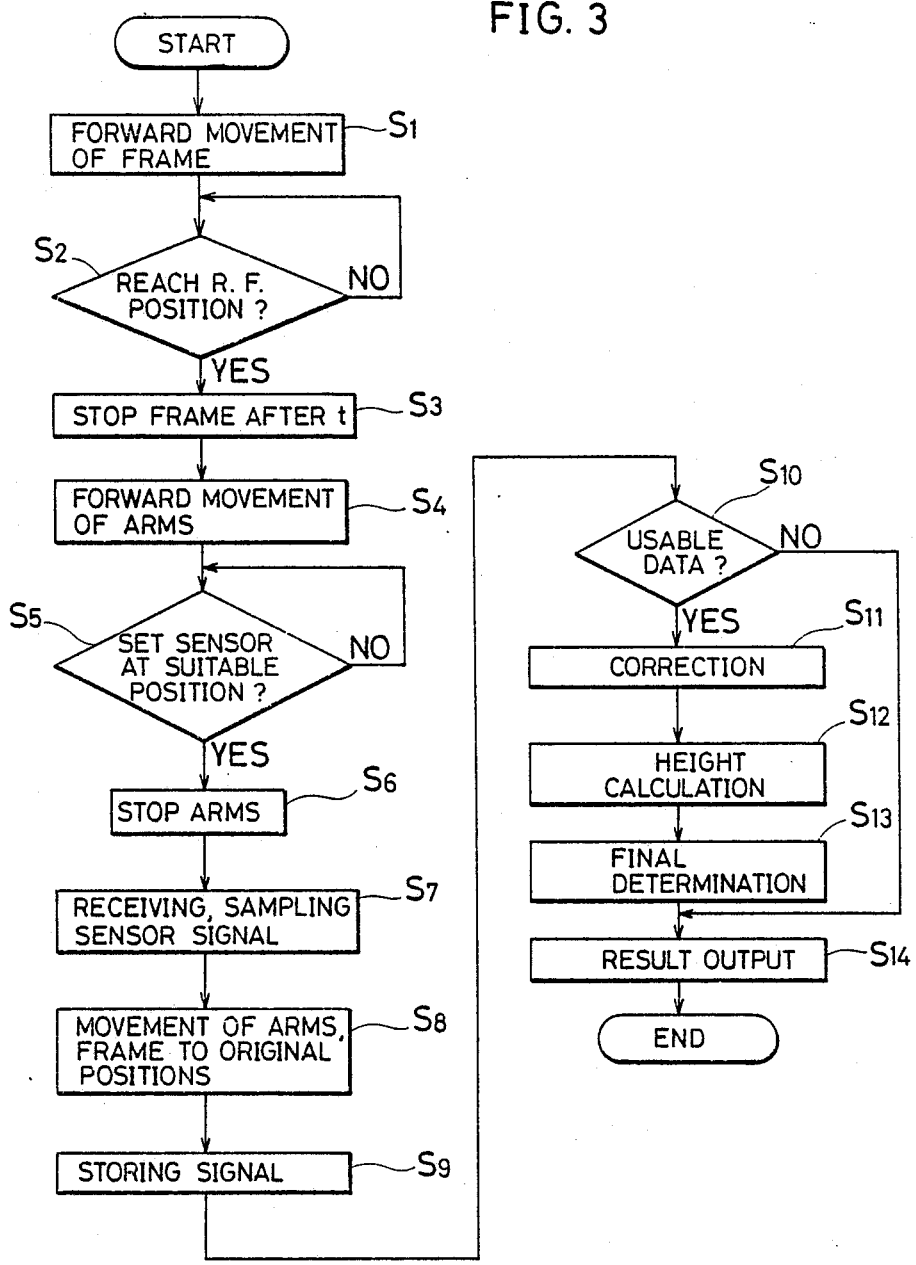
FIG. 3 is a flowchart showing operations of the embodiment.

It would be apparent that the series of operations, shown in FIG. 3, may be controlled by one computer.

Also it would be apparent that the operations of seeing the sensor at the suitable position and moving the frame and arms back to the original positions and the operations of processing data are respectively controlled by separate computers. In this separate computer way, the operation of Step S8 and the operations after Step S9 can be executed at the same time, so that a time which is required for Step S8 in the one computer way is eliminated. Consequently, inspection time is reduced.

As described above, according to the present invention, all the irregularities on a side wall surface of a tire are detected by the use of an optical sensor, and it is checked whether the detection data is unusable due to improper setting of the sensor or dirts on the tire side wall surface, and the usable data is corrected so as to remove detection-unrequired irregularities caused by large letterings, small letterings, or the like, an irregularity falling within a predetermined condition is found out in the corrected data, and the height of the irregularity is calculated, and final determination as to whether there is an abnormal irregularity is then effected based on the calculated height of the irregularity. Accordingly, it could be seen that an apparatus of the present invention assuredly eliminates the influence of letterings, marks and the like and correctly detects detection-required irregularities, thus providing an increased inspection accuracy.

Also, an apparatus of the present invention in which an optical sensor is set at a most suitable detection position assures an easier setting of sensors and also provides a further increased inspection accuracy. Furthermore, since an apparatus of the present invention which has signal sampling means for sampling a signal of the sensor in such an interval that detection areas do not overlap one another in a circumferential direction of the tire, irregularities can be detected at an increased accuracy.

Furthermore, an apparatus of the present invention in which a plurality of optical sensors facing the side wall surface which are provided in a radial direction of the tire at an interval so as to take over their respective portions of a detection zone can attain greatly clearer detection of irregularities than inspection using one large sensor having a large detection area, and thus provides further increased inspection accuracy.

Furthermore, an apparatus of the present invention which has correction means for detecting the width of an irregularity and checking whether the irregularity has a flat center portion so that detection-unrequired irregularities are removed from the data discriminated as usable data by the usable data discrimination means assures more accurate elimination of detection-unrequired irregularities.

What is claimed is:

1. An apparatus for inspecting a side wall of a tire comprising an optical sensor provided so as to face a side wall surface of a rotatable tire for reading a variation of distance to the side wall surface as an irregularity signal, memory means for storing an irregularity signal read by the optical sensor, usable data discrimination means for discriminating whether or not the signal read out from the memory means is usable as irregularity inspection data, correction means for removing detection unrequired irregularities from the data discriminated as usable data by the usable data discrimination means, height calculation means for finding out an irregularity falling within a predetermined condition in the corrected data and calculating the height of the irregularity, and determination means for determining based on the height of the irregularity calculated by the height calculation means whether there is an abnormal irregularity.

2. An apparatus according to claim 1 wherein the optical sensor is able to move to and away from the side wall surface and set at a most suitable detection position specified in advance in accordance with one of tire categories and tire sizes.

3. An apparatus according to claim 1 or 2 wherein the optical sensor has a spot diameter of 1.00 mm or smaller, and further comprises signal sampling means for sampling a signal of the sensor in such an interval that detection areas do not overlap one another in a circumferential direction of the tire.

4. An apparatus according to claim 1 or 2 wherein a plurality of optical sensors facing the side wall surface are provided in a radial direction of the tire at an interval.

5. An apparatus according to claim 1 or 2 wherein the correction means finds out the width of an irregularity and checks whether the irregularity has a flat center portion so that an detection-unrequired irregularity is removed from the data discriminated as usable data by the usable data discrimination means.

6. An apparatus according to claim 3 wherein a plurality of optical sensors facing the side wall surface are provided in a radial direction of the tire at an interval.

7. An apparatus according to claim 3 wherein the correction means finds out te width of an irregularity and check whether the irregularity has a flat center portion so that an detection-unrequired irregularity is removed from the data discriminated as usable data by the usable data discrimination means.

8. An apparatus according to claim 4 wherein the correction means finds out the width of an irregularity and checks whether the irregularity has a flat center portion so that an detection-unrequired irregularity is removed from the data discriminated as usable data by the usable data discrimination means.

* * * * *